United States Patent [19]
Allen

[11] Patent Number: 5,184,738
[45] Date of Patent: Feb. 9, 1993

[54] STORAGE RACK SYSTEMS
[75] Inventor: Donald R. Allen, Frenchtown, N.J.
[73] Assignee: Frazier Industrial Company, Long Valley, N.J.
[21] Appl. No.: 709,664
[22] Filed: Jun. 7, 1991
[51] Int. Cl.⁵ .............................................. A47F 5/00
[52] U.S. Cl. .................................... 211/151; 414/276
[58] Field of Search ...................... 211/151, 59.2, 162; 414/276, 286

[56] References Cited

U.S. PATENT DOCUMENTS

| | | | |
|---|---|---|---|
| 4,341,313 | 7/1982 | Doring | 211/151 |
| 4,462,500 | 7/1984 | Konstant et al. | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 211/151 |
| 5,080,241 | 1/1992 | Konstant | 211/151 |

Primary Examiner—Robert W. Gibson, Jr.
Attorney, Agent, or Firm—Joseph W. Molasky & Associates

[57] ABSTRACT

Storage rack systems having a plurality of storage bays adapted to store pallet loads that are three, four and five pallets deep are disclosed. Each of the systems includes a pair of outer tracks extending the full depth of the storage rack and a pair of inner tracks located inside of the outer tracks and extending for a short distance. A lower cart for each of the three, four and five deep systems is provided with a pair of front wheels which ride on the outer tracks and a pair of rear wheels which ride on the inner tracks.

16 Claims, 9 Drawing Sheets

STORAGE RACK SYSTEMS

BACKGROUND OF THE INVENTION

1. Field of the Invention

This invention relates generally to storage rack systems for articles loaded on pallets of the type adapted to be handled by lift trucks and, more particularly, to storage rack systems of the push-back type.

2. Description of the Prior Art

Push-back storage systems are known in the art with a two-deep system being in use since the late 1950's, this system being manufactured by Frazier Industrial Company. More recently, three-deep and four-deep systems are known in the art. In my U.S. Pat. No. 4,955,489 there is disclosed a storage rack system of the push-back type, and reference is made to the prior art cited in said prior application. In U.S. Pat. No. 4,949,852 there is disclosed three-deep and four-deep systems having a double cart assembly wherein a large cart rides on the tracks and a small cart is carried by and movably mounted on the large cart.

Typical of the prior art are the storage rack systems shown in U.S. Pat. Nos. 4,341,313 and 4,773,546 wherein there is disclosed a storage rack system to provide for the storage of three pallets deep.

SUMMARY OF THE INVENTION

It is the general object of the invention to provide a storage rack system for storing pallet loads of multiple pallets deep comprising a construction that involves a minimum cost in both manufacture and installation.

Another object of the invention is to provide a storage rack system of the indicated type which incorporates a track means for guiding a plurality of carts along the depth of the system wherein there are provided an outer pair of tracks and an inner pair of tracks located inside of said outer tracks. A lower cart is adapted to ride on said inner and outer tracks and, to this end, is provided with a pair of front wheels which are adapted to ride on the outer pair of tracks and a pair of rear wheels which are adapted to ride on the inner pair of tracks as said lower cart moves from a forward position at the entry end of the storage bay and a back position located two pallets deep from the entry end of the storage bay. A second cart is adapted to ride on said outside tracks from a position at the entry end of the storage bay to a position three pallets deep from the entry end of the storage bay.

Another object of the invention is to provide a storage rack system of the indicated type for storing pallet loads of five pallets deep, said system including a third pair of tracks located outwardly of said second pair of tracks and a third cart and a fourth cart adapted to ride on said second and third pairs of tracks.

Another object of the invention is to provide a storage rack system of the indicated type which employs all structural components comprising commercially available hot rolled structural steel components and forms.

An advantage of the storage rack system in accordance with the invention is that it can be designed to employ similar carts and use similar components in either a three deep, a four deep or a five deep system.

Another advantage of the storage rack system in accordance with the invention is that it permits the use of a cart design wherein the carts have a minimum length, i.e., the dimension in the direction of the depth of the storage rack. This is possible since the design avoids the use of an interlocked cart design of the type in use today in the art. Thus, the design in accordance with the invention permits the design of the track to be equal to the depth of the pallets and avoids the necessity of running the track pursuant to the depth of the carts. More particularly, the design in accordance with the invention can reduce the depth of the rear pallet overhang of a comparable interlocked cart design by about 19 to 20 inches.

Another advantage of the storage rack system in accordance with the invention is that in the case of a three deep design, the tracks can be made to be of C-shaped rails thereby reducing the cost of the rails which are part of the storage rack system.

Another advantage of the storage rack system in accordance with the invention is that by designing the carts of a length equal to the depth of a pallet, a load can be placed directly over the load bearing wheels of the cart thereby distributing the load more effectively. This cart design also allows a more effective use of channels, I-beams, angles, and tube sections that are readily available, that are easier for fabrication and that offer a structurally safe loading condition. This cart design is a substantial improvement over the extended carts of the type associated with interlocking cart designs (which extended carts are normally 10-20" deeper than the loading being stored thereon) since these extended carts tend to throw more load onto the front wheels thereby causing a more unstable cart and more chance for excessive deflection in the center of the cart. Thus, the extended cart design could cause binding of the lower carts with the upper carts which could have a permanent set and thereby have a structural failure within the tube section being used.

DETAILED DESCRIPTION OF THE PREFERRED EMBODIMENTS

In FIGS. 1-10 there is shown a storage rack system in accordance with the invention adapted to store pallet loads of five pallets deep. This system comprises a framework providing a plurality of storage bays each of which is defined by a plurality of uprights and horizontal shelf beams constructed and arranged in a generally conventional arrangement, such as, for example, the storage racks manufactured by Frazier Industrial Company. The framework is shown only partially in the drawings but is shown in more detail in said U.S. Pat. Nos. 4,949,852 and 4,955,489.

Each of the storage bays is constructed of a depth to accommodate two rows of pallets. To this end, there are provided five vertically extending upright frames indicated at 10, 11 and 12, 13 and 14, each of which is comprised of a pair of upright columns joined by horizontally extending ties and, where needed, crossbrace members, this frame structure being conventional in the art and being employed in the storage racks of Frazier Industrial Company. Each of the right side upright frames 10-14 is connected with a corresponding upright frame 10'-14' on the left side of a storage bay by means of a plurality of horizontal shelf beams including a front shelf beam 15, four interior shelf beams 16A-D and a rear shelf beam 17. The interior shelf beams 16A-D are connected, by means of bolts and connectors, at their ends with aligned columns of the upright frames 10-14 and 10'-14'. This connection design is conventional, the arrangement of the upright frames and horizontal shelf beams being described in detail in said prior patents, and serves to provide support means for the pallets containing the stored loads and to support the track means and carts for positioning the pallet loads in the storage bays. It will be apparent that each storage bay is of a size to contain as many as two rows of pallets each five deep.

For each row of pallets, there is provided a track means extending along the depth of the storage bay. In the case of the five deep system shown in FIGS. 1-10, wherein there are provided four carts, the track means comprises three pairs of associated tracks, namely, a pair of inner first tracks 21, a pair of middle second tracks 22 and a pair of outer third tracks 23. The pair of second tracks 22 and the pair of third tracks 23 are constructed to extend from the front to the back of the storage bay along the entire depth thereof, while the pair of first tracks 21 are adapted to extend only a short distance, namely, in the region of two pallets deep from the entry end of the storage bay. To this end, the first tracks 21 are supported on the interior shelf beams 16A and 16B.

The first tracks 21 are each provided by a structural member having a C-shaped cross section, each being arranged to provide inwardly facing flanges. The second and third tracks 22,23 are each provided by a structural member having an I-shaped cross section, said members being arranged to provide a pair of inwardly facing flanges which provide the second tracks 22 and a pair of outwardly facing flanges which provide the third tracks 23. Each structural member providing tracks 21, 22 and 23 of the track means is supported on and secured to a plurality of the shelf beams 15, 16A-D, 17 in a conventional manner as known in the art and described in detail in said prior patents. Briefly, each of said I-shaped structural members providing tracks 22, 23 is bolted to a front shelf beam 15 by means of angle brackets and is supported on interior shelf beams 16A-D and secured thereto by brackets 16', the rear shelf beam 17 being mounted so that the I-shaped structural members run over the top thereof and are secured thereto by the use of a plate 17' that runs behind said structural members and the rear shelf beam 17 as is discussed in said prior patents. Also, each of said C-shaped structural members providing tracks 21 is supported on interior shelf beams 16A and 16B and secured thereto by brackets 16'.

Figure 1:
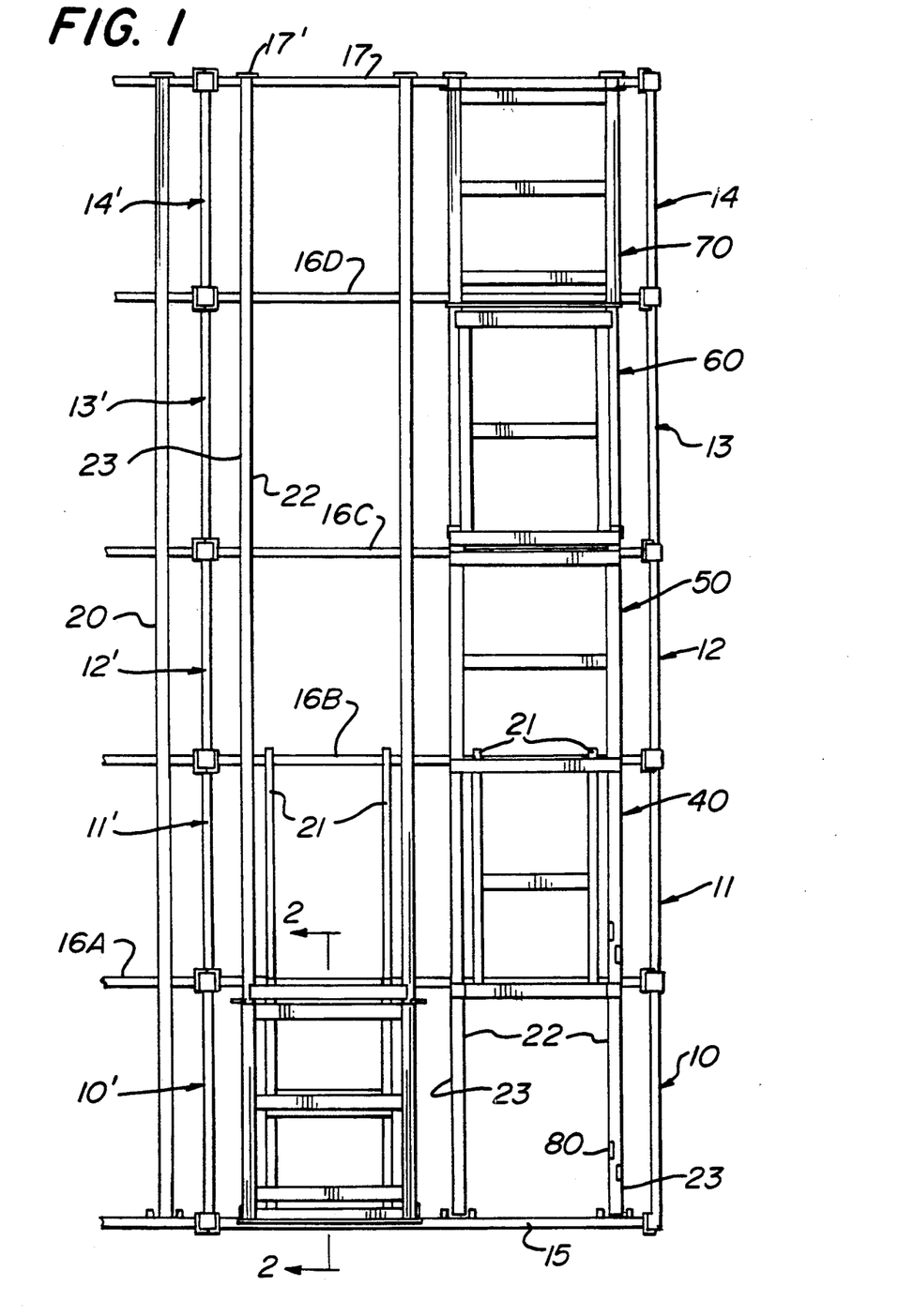
FIG. 1 is a plan view of part of a storage rack system in accordance with the invention.

In the five deep system in accordance with the invention shown in FIGS. 1-10 there are provided four carts 40, 50, 60 and 70, which are adapted to ride on the track means comprising the three pairs of tracks 21, 22, 23 discussed above, for movement along the depth of the storage bay as will be described in detail hereafter. Briefly stated, each of the carts 40, 50, 60 and 70 is mounted for movement along the track means between a forward position and a back position. Referring to FIG. 1, the forward position of each of the carts 40, 50, 60 and 70 is shown in the lefthand row of the storage bay shown in this figure, and the back positions of said carts is shown in the right-hand row of the storage bay shown in this figure.

Figure 5:
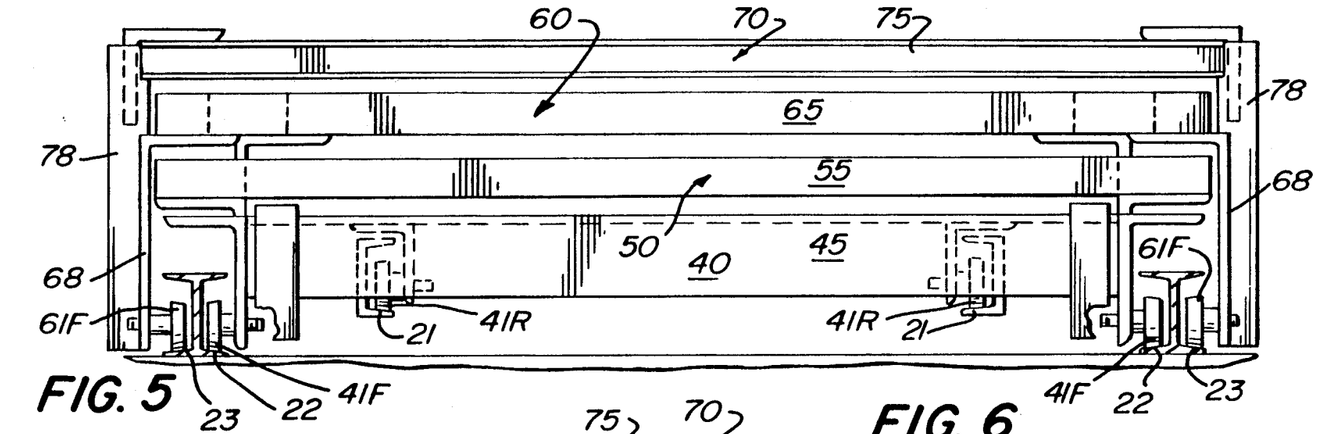
FIG. 5 is a front end view of FIG. 3A.
Figure 7:
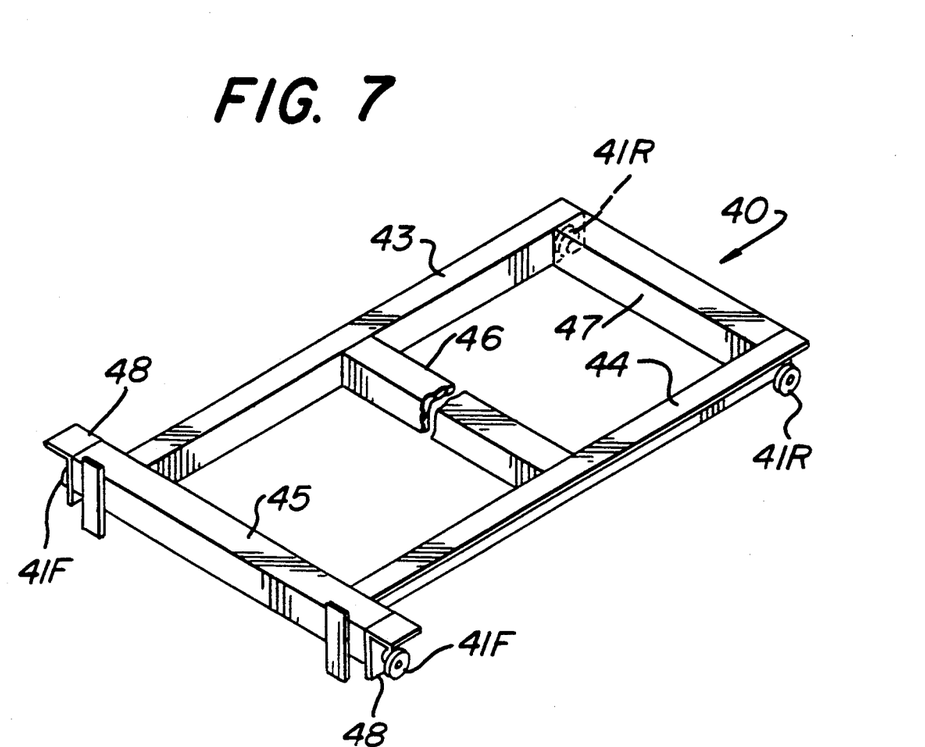
FIGS. 7, 8, 9 and 10 are detail views.

The first cart 40, which may be termed the lower cart, includes a rectangular frame formed of a plurality of structural members welded together and best shown in FIG. 7. The frame of cart 40 comprises a pair of side structural angles 43 and 44, a front structural angle 45, a middle structural angle 46 and a rear structural angle 47. Side angles 43 and 44 are welded at their front ends to front angle 45 at locations spaced inwardly from the end portions thereof as is best shown in FIG. 7. Middle angle 46 and rear angle 47 extend between and are welded at their ends to side angles 43 and 44. A pair of angle brackets 48 are welded to the ends of front angle 45 in an arrangement shown in FIG. 7 to provide a horizontally extending leg portion extending outwardly from the upper leg portion of their associated end of front angle 45 and a downwardly extending leg portion at each end of front angle 45 for supporting the front wheel assemblies 41F of cart 40. There are provided two bearing-type wheel assemblies mounted on each side of the front cart frame at the front and rear ends thereof to provide four rolling supports for act 40, the front wheel assembly on each side being indicated at 41F and the rear wheel assembly on each side being indicated at 41R. The construction of the wheel assemblies 41F and 41R and their mounting on the first cart frame will be described more fully hereafter. As best shown in FIG. 5, the front wheel assemblies 41F ride on the inwardly facing tapered bottom flange portions of the I-shaped structural member forming second tracks 22 and the rear wheel assemblies 41R ride on the inwardly facing bottom flange portions of the C-shaped structural members forming first tracks. The frame for cart 40 is of a size so as to support a pallet load, as indicated by the pallet load B in the arrangement shown in FIG. 3A.

Figure 2:
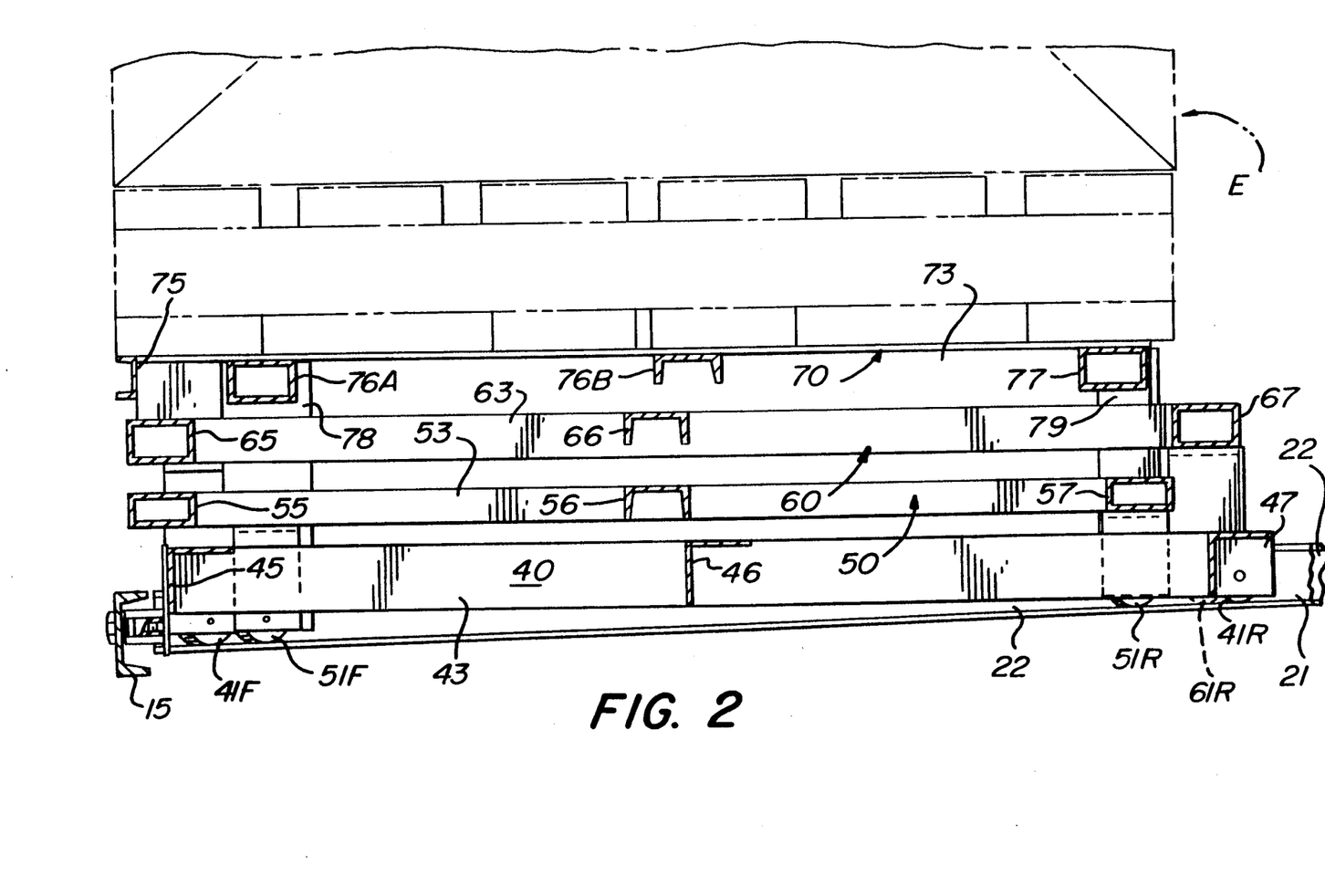
FIG. 2 is a section taken on line 2—2 of FIG. 1.
Figure 8:
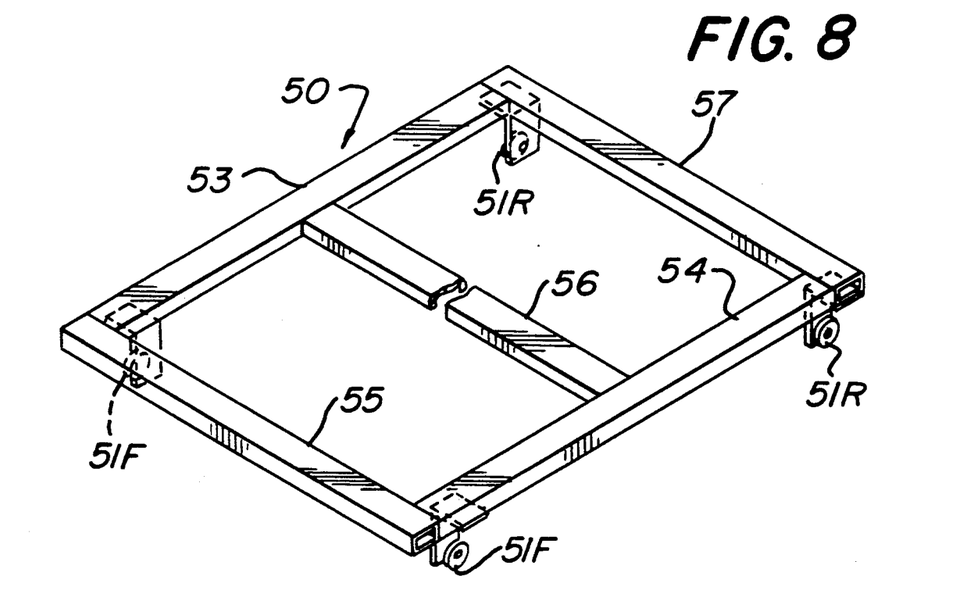

The second cart 50, which may be termed a lower middle cart, is manufactured as an independent unit and includes a rectangular frame for providing support for a loaded pallet, a plurality of wheel assemblies 51F and 51R on each side of the cart frame, and means for supporting each of the wheel assemblies 51F, 51R to make rolling contact with second tracks 22 as cart 50 moves along the depth of the storage bay between a forward and a back position. Second cart 50 includes a rectangular frame formed of five structural members welded together as best shown in FIG. 8. Cart 50 comprises a pair of side tubes 53 and 54, a front tube 55, a middle channel 56 and a rear tube 57. A pair of bearing-type wheel assemblies 51F and 51R are mounted at the front and rear ends of side tubes 53 and 54 so as to provide four rolling supports for the second cart 50. As best shown in FIG. 8 the front wheel assemblies 51F are mounted to be spaced rearwardly a short distance from the front end of the cart for a purpose which will be described more fully hereafter. The second cart wheel assemblies 51F and 51R ride on the inwardly facing tapered bottom flange portions of the I-shaped structural members forming the pair of second tracks 22 at locations rearwardly of the front wheel assemblies 41F of first cart 40 as shown in FIG. 2. The frame for cart 50 is of a size so as to be able to support a pallet load as indicated by the pallet load C in the arrangement shown in FIG. 3A.

Figure 6:
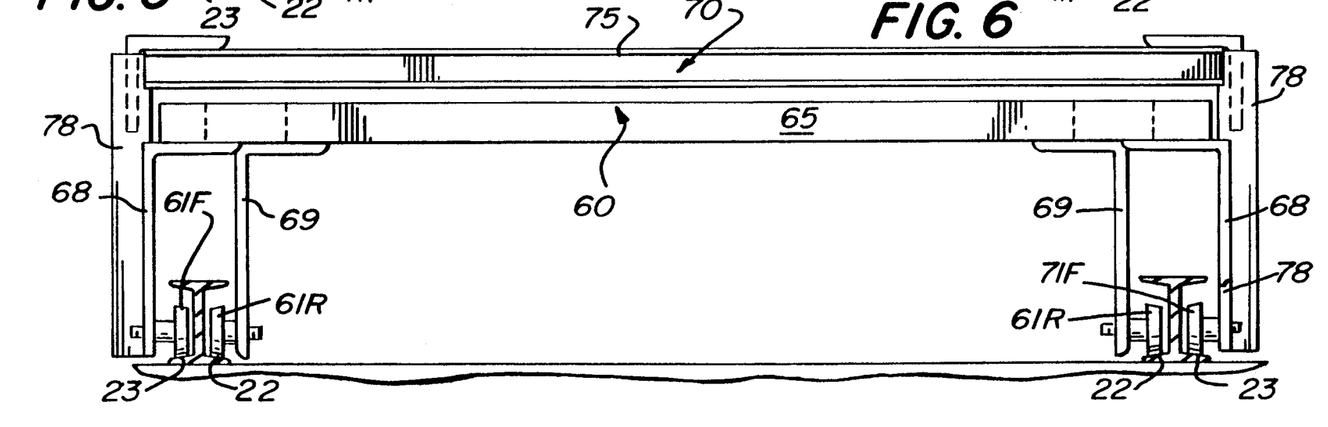
FIG. 6 is a view taken on line 6—6 of FIG. 3B.
Figure 9:
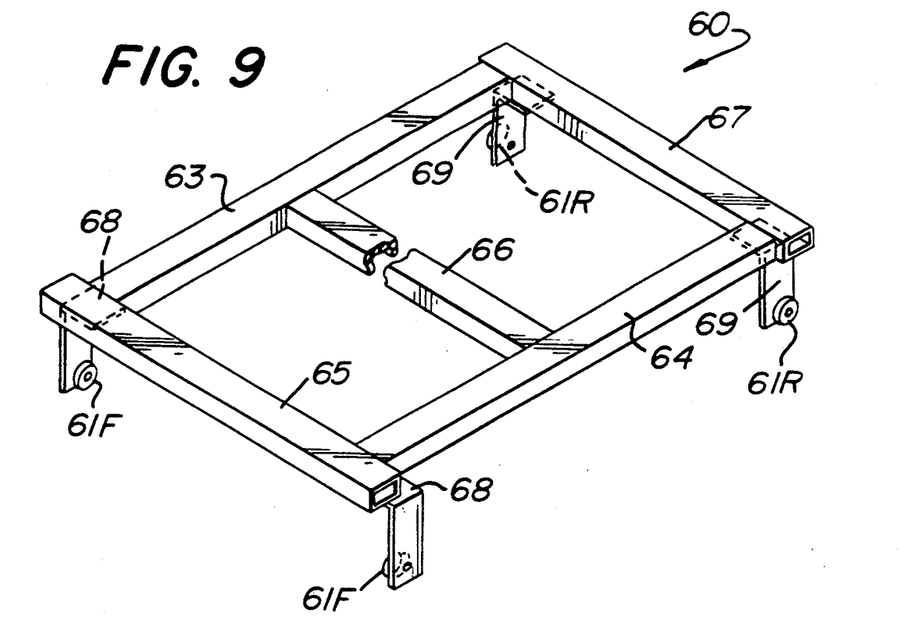

The third cart 60, which may be termed the upper middle cart, includes a rectangular frame formed of a plurality of structural members welded together and best shown in FIG. 9. The frame of cart 60 comprises a pair of side structural tubes 63 and 64, a front structural tube 65, a middle structural channel 66 and a rear structural tube 67. Side tubes 63 and 64 are welded at their front ends to front tube 65 at locations spaced inwardly from the end portions thereof as is best shown in FIG. 9. Middle tube 66 and rear tube 67 extend between and are welded at their ends to side tubes 63 and 64. A pair of angle brackets 68 are welded to the front end of cart 60 to provide downwardly extending leg portions for supporting inwardly facing front wheel assemblies 61F of cart 60. A pair of angle brackets 69 are welded to the rear end of cart 60 to provide downwardly extending leg portions for supporting outwardly facing rear wheel assemblies 61R of cart 60. As best shown in FIG. 6, the inwardly facing front wheel assemblies 61F ride on the outwardly facing tapered bottom flange portions of the I-shaped structural member forming third tracks 23 and the outwardly facing rear wheel assemblies 61R ride on the inwardly facing bottom flange portions of the structural members forming second tracks 22. The frame for cart 60 is of a size so as to support a pallet load, as indicated by the pallet load D in the arrangement shown in FIG. 3B.

Figure 3A:
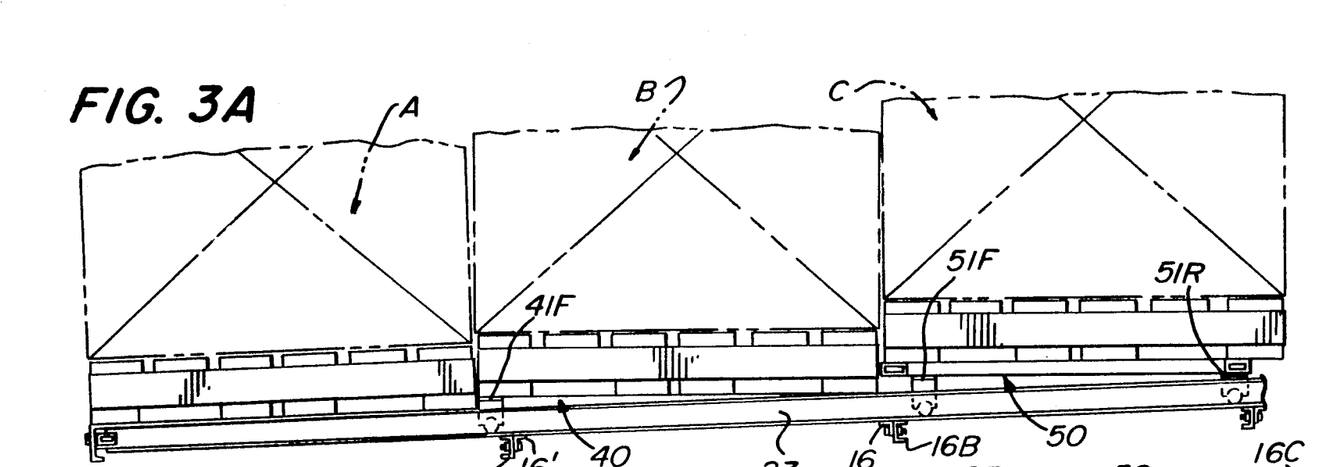
FIGS. 3A and 3B are a side elevation of FIG. 1.
Figure 3B:
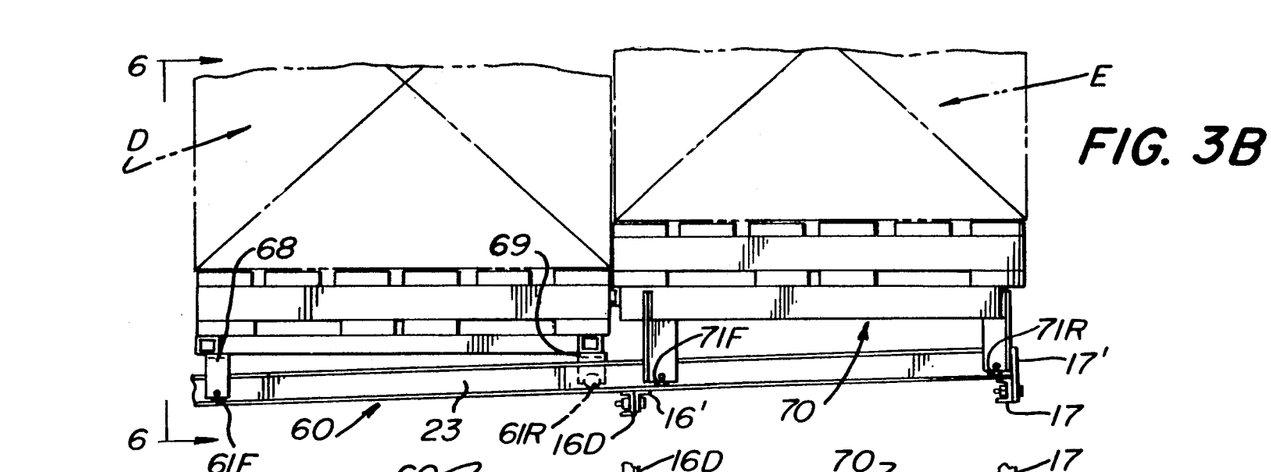
Figure 4A:
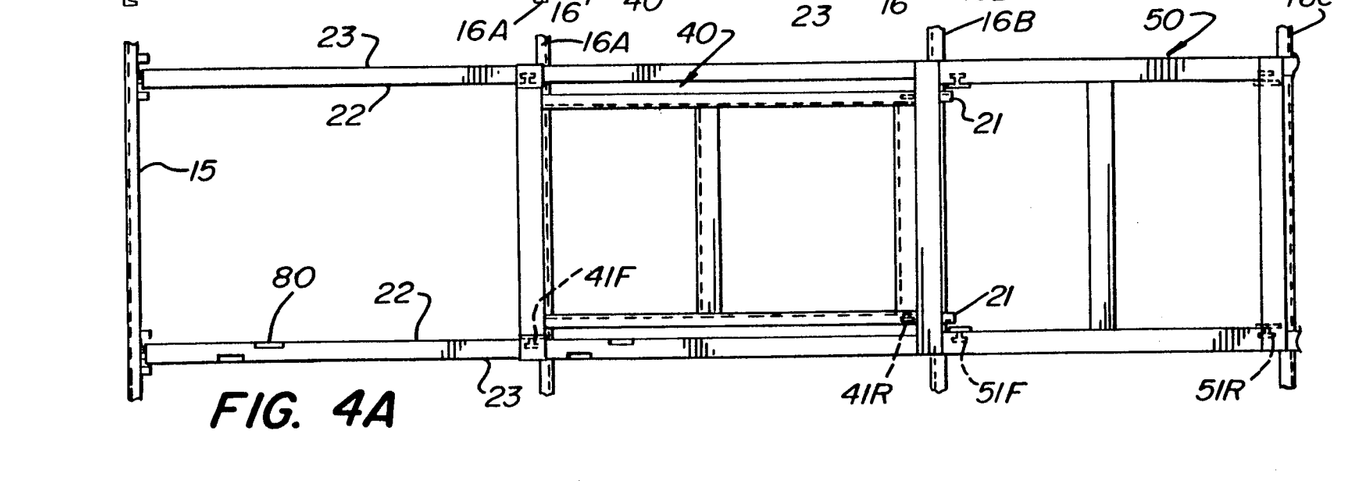
FIGS. 4A and 4B are plan views of FIGS. 3A and 3B.
Figure 4B:
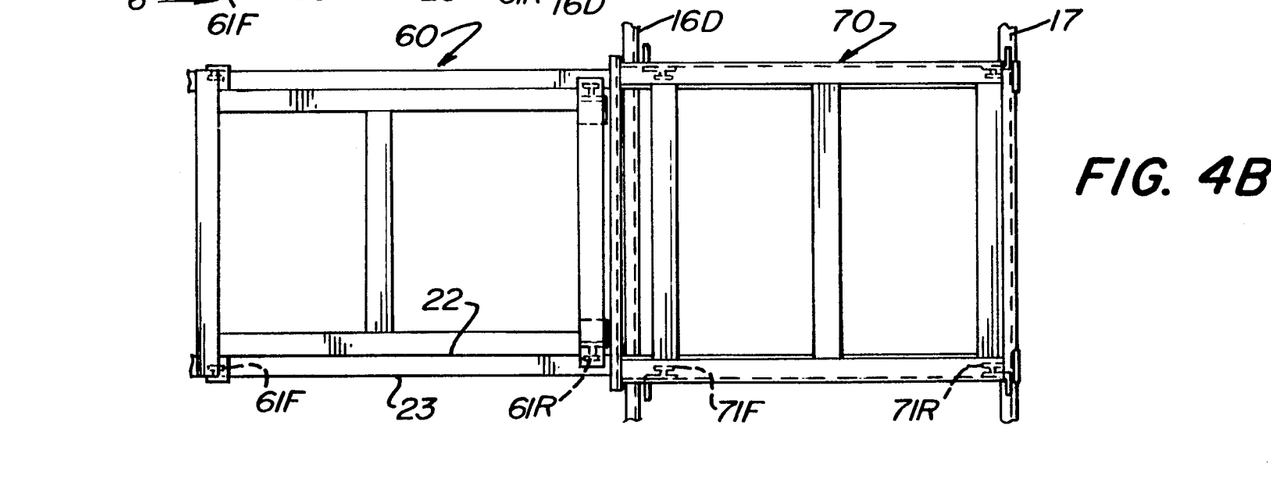
Figure 10:
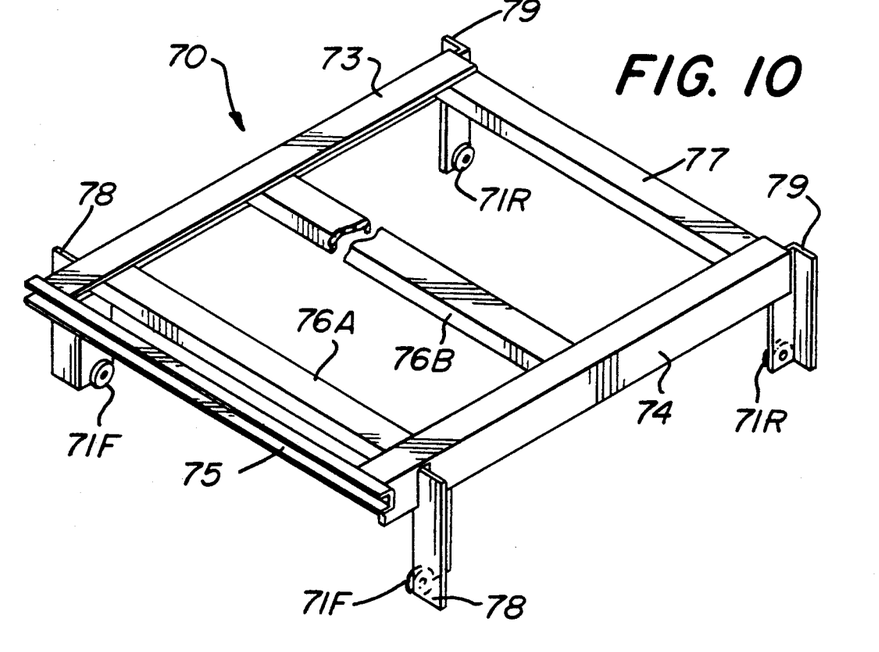

The fourth cart 70, which may be termed the upper cart, is manufactured as an independent unit and includes a rectangular frame for providing a support for a loaded pallet, a plurality of wheel assemblies 71F and 71R on each side of the cart fame and means for supporting each of the wheel assemblies 71F, 71R to make rolling contact with third tracks 23 as cart 70 moves along the depth of the storage bay between a forward and a back position. Second cart 70 includes a rectangular frame formed of six structural members welded together as best shown in FIG. 10. Cart 70 comprises a pair of side angles 73 and 74, a front channel 75, a pair of middle members, i.e. tube 76A and channel 76B, and a rear tube 77. A pair of bearing-type wheel assemblies 71F and 71R are mounted at the front and rear ends of side angles 73 and 74 so as to provide four rolling supports for fourth cart 70. To this end, a pair of angle brackets 78 are welded to the downwardly extending legs of side angles 73 and 74 in an arrangement as best shown in FIG. 10 to provide a downwardly extending leg portion at each end of the tube 76A for supporting inwardly facing front wheel assemblies 71F of cart 70. Also, a pair of angle brackets 79 are welded to the downwardly extending legs of angles 73 and 74 in an arrangement as best shown in FIG. 10 to provide a downwardly extending leg portion at each end of the rear tube 77 for supporting inwardly facing rear wheel assemblies 71R. As best shown in FIGS. 3B, 10, by this construction the front wheel assemblies 71F are mounted to be spaced rearwardly a short distance from the front end of cart 70 for a purpose which will be described more fully hereafter. The fourth cart wheel assemblies 71F and 71R are arranged to ride on the outwardly facing tapered bottom flange portion of the I-shaped structural members forming the pair of third tracks 23 at locations rearwardly of the front wheel assemblies 61F of third cart 60 as shown in FIG. 3B. The frame for cart 70 is of a size so as to be able to support a pallet load as indicated by the pallet load E in the arrangement shown in FIG. 3B.

The wheel assemblies for the carts 40, 50, 60 and 70 are of the same construction and are mounted on vertically extending leg portions of said carts by conventional means and in a manner as described in detail in said prior mentioned patents. Briefly, the mounting means comprises horizontally extending holes punched in vertically extending legs of the wheel supporting brackets with each hole being used to mount a wheel assembly. Each of the wheel assemblies has a horizontally extending axle having a threaded reduced diameter portion extending on a horizontal axis through the hole in the vertically extending supporting bracket. Typically, the reduced diameter portion of the axle extends through a pair of washers on the opposite sides of said vertically extending legs and is threadedly engaged with a nut in an arrangement whereby the axle is secured in place to extend on a horizontal axis. A wheel rim is rotatably supported on a hub of the axle by means of roller bearing means positioned between the hub and the wheel rim by conventional sealed roller bearing construction. The wheel rim is formed with a tapered outer or rolling surface, the taper angle being the same as the taper angle formed on the associated bottom flange portion of the structural member forming tracks 21, 22 and 23.

The cart 40 is mounted into the tracks 21 and 22 by the use of a single cut-out formed in the upper flange of the structural member forming track 22, said cut-out 80 being shown in FIG. 1. The installation procedure involves inserting the rear wheel assemblies 41R into the front end of the tracks 21 and sliding the same in a rearward direction to bring one front wheel assembly 41F into alignment with the cut-out 80 in tracks 22 and then maneuvering the front wheel assemblies 41F into the tracks 22. Cart 40 can now move between its forward position at the entry end of the storage bay and a two deep pallet position. It is noted that the cart 40 cannot move rearwardly beyond the two deep pallet position since it is stopped by contact of the front angle 45 with the front end of the structural members forming tracks 21, wherefore there is no need to provide for stops on the tracks since cart 40 is locked in by the front angle 45 thereby providing a foolproof installation. Each of the carts 50, 60 and 70 is mounted into their associated tracks 22 and/or 23 in a conventional manner by the use of a pair of cut-outs formed in the upper flanges of the structural members forming said associated tracks. As is conventional, the cut-outs are located to correspond to the spacing of the wheel assemblies of said carts. Actual field insertion is achieved by a procedure well known in the art whereby the carts are tilted at an angle and the leftside wheels are slipped into the lefthand tracks and the cart is maneuvered so that the right-side cart wheels can then be dropped through the track cut-outs in the upper flanges of the track means.

In accordance with the invention, cart 40 is arranged so that its front wheel assemblies 41F ride on the tracks 22 while its rear assemblies 41R ride on the tracks 21 as cart 40 moves between a forward position at the entry end of the storage bay and a back position two pallets deep from the entry end of the storage bay. Cart 50 is arranged so that both its front and rear wheel assemblies 51F and 51R are positioned to ride on the tracks 22 as cart 50 moves between a forward position at the entry end of the storage bay and a back position three pallets deep from the entry end of the storage bay. Cart 60 is arranged so that its front wheel assemblies 61F ride on third tracks 23 and its rear wheel assemblies 61R ride on second tracks 22 as cart 60 moves from a forward position at the entry end of the storage bay and a back position four pallets deep from the entry end of the storage bay. Cart 70 is arranged so that both its front and rear wheel assemblies 71F and 71R ride on the third tracks 23 as cart 70 moves from a front position at the entry end of the storage bay and a back position five pallets deep from the entry end of the storage bay.

The carts 40, 50, 60 and 70 are constructed and arranged so that the forward position of cart 50 overlies the forward position of cart 40, the forward position of cart 60 overlies the forward position of carts 40 and 50, and the forward position of cart 70 overlies the forward positions of carts 40, 50, and 60. The front wheel assemblies 51F of cart 50 are spaced rearwardly of the forward end of cart 50 so that said front wheel assemblies 51F avoid contact with the front wheel assemblies 41F of cart 40 when said carts 40 and 50 are in the forward positions thereof. This ensures that the front end of cart 50 can be positioned at the front shelf in the forward position of cart 50 so that it is properly positioned to have a pallet load delivered to and removed therefrom at the entry end of the storage bay. Likewise, front wheel assemblies 71F of cart 70 are spaced rearwardly from the forward end of cart 70 so that said front wheel assemblies 71F avoid contact with the front wheel assemblies 61F of cart 60 when said carts 60 and 70 are in the forward positions thereof to thereby ensure that the front end of cart 70 can be positioned at the front shelf 15 in the forward position of cart 70. It is also noted that the rear wheel assemblies 61R of cart 60 are positioned to avoid contact with the rear wheel assemblies 51R of cart 50 when the carts 50 and 60 are in the forward positions thereof in order to ensure that the carts can be positioned at the proper forward position at the front shelf 15.

As is described in said prior patents there are provided suitable bumper means for holding the carts 40, 50, 60 and 70 in their forward position at the entry end of the storage bay.

The pairs of tracks 21, 22 and 23 are all mounted on the shelf beams of the framework so that they extend at a slight inclination toward the entry end of the storage bay. As is described in detail in said prior patents, the inclination is achieved by the accurate locating of the position of the supporting structure for the track means and is typically about 5/16 inch for each 12 inches of length.

Carts 40, 50, 60 and 70 are constructed so that the pallet supporting top surface of each cart is maintained in a level (i.e., horizontal) position on the inclined track means for said carts. This type of cart construction is described in detail in said U.S. Pat. No. 4,955,489 with respect to FIGS. 18-19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 21, 22 and 23 rides therealong. Thus, the supporting surface of the cart remains level even though the cart moves along an inclination as it moves between its forward and back positions on the inclined tracks supporting the same.

As is apparent from a consideration of the drawings, the forward position of carts 40, 50, 60 and 70 are located at the entry end of the storage bay, the back position of first cart 40 being two pallets deep from the entry end of the storage bay, the back position of second cart 50 being three pallets deep from the entry end of the storage bay, the back position of third cart 60 being four pallets deep from the entry end of the storage bay, and the back position of fourth cart 70 being five pallets deep from the entry end of the storage bay. Thus, each row of the storage bay can store five pallet loads A, B, C, D and E in an arrangement as best shown in FIGS. 3A, 3B. The front pallet supporting load A is supported on the track means on the two I-shaped structural members forming tracks 22 and 23, the pallet supporting load B is supported on first cart 40, the pallet supporting load C is supported on the second cart 50, the pallet supporting load D is supported on the third cart 60, and the pallet supporting load E is supported on the fourth cart 70.

The pallets load A, B, C, D and E will be placed in the position shown in FIGS. 3A, 3B by a conventional push-back loading technique employing conventional fork trucks, which technique is well known in the art and described in detail in said prior patents. Thus, the first pallet load E to be stored will be placed on the empty fourth cart 70 which has assumed its position at the entry end of the storage bay as described above. When it is desired to store the second pallet D in the storage bay, the fork truck approaches the storage rack at an elevation such that the fork truck and the second pallet load D gently nudge the first load E toward the rear, whereby said first load E and cart 70 supporting the same will be pushed rearwardly toward the rear of the storage rack up to the point where the fork truck can place the load D onto the empty third cart 60. When it is desired to store a third pallet load C, the fork truck with the said third load C approaches the storage rack and the pallet load C gently nudges the first two loads D and E toward the rear whereby the loads D and E, and the carts 60 and 70 supporting the same, are pushed back rearwardly toward the rear of the storage rack up to the point where the fork truck can place the load C on the empty second cart 50. When the fourth load B is to be stored, the fork truck with the pallet load B thereon gently nudges the other pallet loads C, D and E supported on carts 50, 60 and 70, respectively, toward the rear of the storage rack until the storage truck can deposit the fourth load B on the empty first cart 40. When the fifth pallet load A is to be stored, the fork truck with the pallet load A thereon gently nudges the other pallet loads B, C, D and E supported on carts 40, 50, 60 and 70, respectively, toward the rear of the storage rack until the fork truck can deposit the fifth load A on the structural members providing tracks 22 and 23 and the front shelf beam 15 at the forward loading position at the entry end of the storage bay. In this manner the row of the storage rack is fully loaded with five pallet loads. In order to unload the five pallet loads, a procedure which is essentially the reverse of the above-described procedure is employed.

Figure 11:
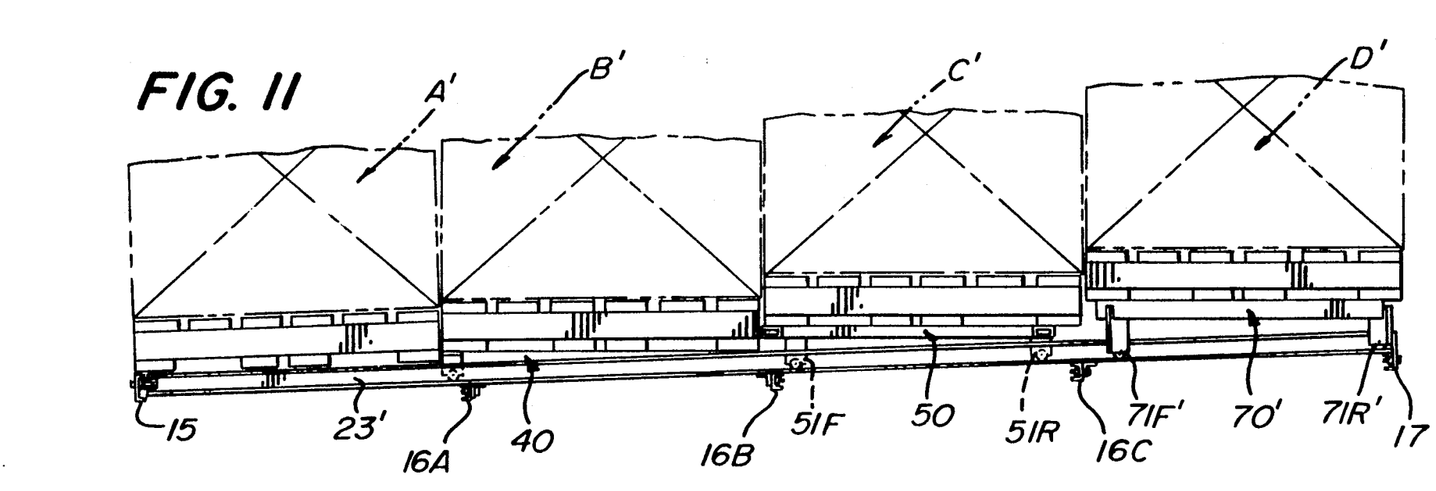
FIG. 11 is a side elevation of a 4-deep system.
Figure 12:
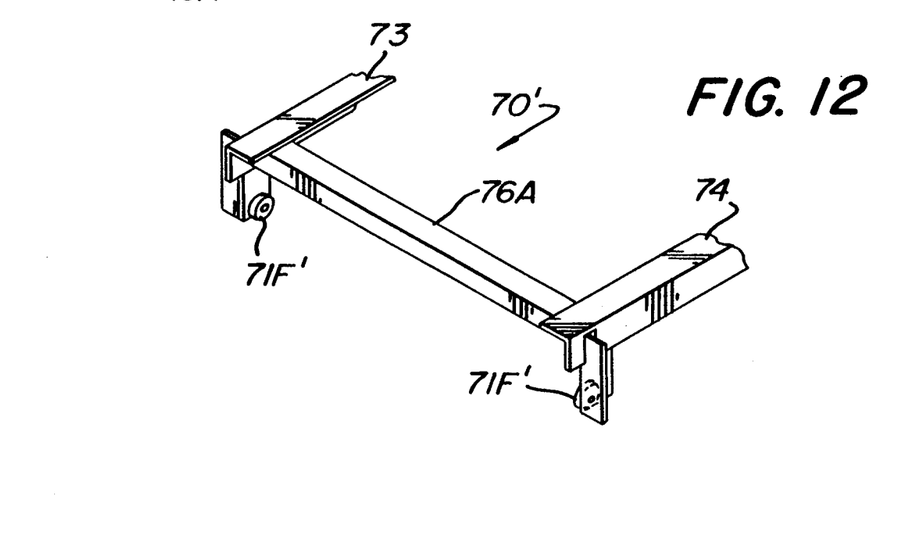
FIG. 12 is a detail view.

In FIGS. 11-12 there is shown a storage rack system in accordance with the invention for storing four pallets deep which system comprises the same carts 40 and 50 as the storage rack system shown in FIGS. 1-10 and a cart 70′ which is essentially the same as cart 70. One difference between said systems is that the framework of the system shown in FIGS. 11-12 is constructed for storing four pallets deep. Another difference between said systems is that the upper middle cart 60 has been eliminated since it is not necessary for the four deep system. Accordingly, in FIGS. 11-12 the same parts have been given the same reference numerals and corresponding modified parts have been given the same reference numerals with primes added.

The embodiment shown in FIGS. 11-12 comprises a framework which provides a plurality of storage bays adapted to contain two pairs of track means for storing two rows of pallets four deep, said framework including shelf beams 15,16A-C and 17. The track means comprises an I-shaped structural member forming tracks 22' and 23' and a C-shaped structural member forming tracks 21 which members are supported on the shelf beams 15, 16A, 16B, 16C and 17 in the same manner as described above with respect to the embodiments shown in FIGS. 1-10.

Briefly stated, the pairs of associated tracks are adapted to support the lower cart 40, the middle cart 50, and the upper cart 70' in the same manner as described above with respect to FIGS. 1-10 for guiding said carts for movement along the depth of the storage bay between a forward and a back position. The forward positions of carts 40, 50 and 70' are located at the entry end of the storage bay, the back position of cart 40 being two pallets deep from the entry end of the storage bay, the back position of middle cart 50 being three pallets deep from the entry end of the storage bay and the back position of upper cart 70' being four pallets deep from the entry end of the storage bay. Thus, each row of the storage bay can store four pallet loads A', B', C' and D' in an arrangement as best shown in FIG. 11. The front pallet supporting load A' is supported on the track means, the pallet supporting load B' is supported on the lower cart 40, the pallet supporting load C' is supported on middle cart 50, and the pallet supporting load D' is supported on the upper cart 70' The pallet loads A', B', C' and D' will be placed in the position shown in FIG. 11 by the conventional push-back loading technique in the same manner as described above with respect to the embodiment shown in FIGS. 1-10.

Figure 13:
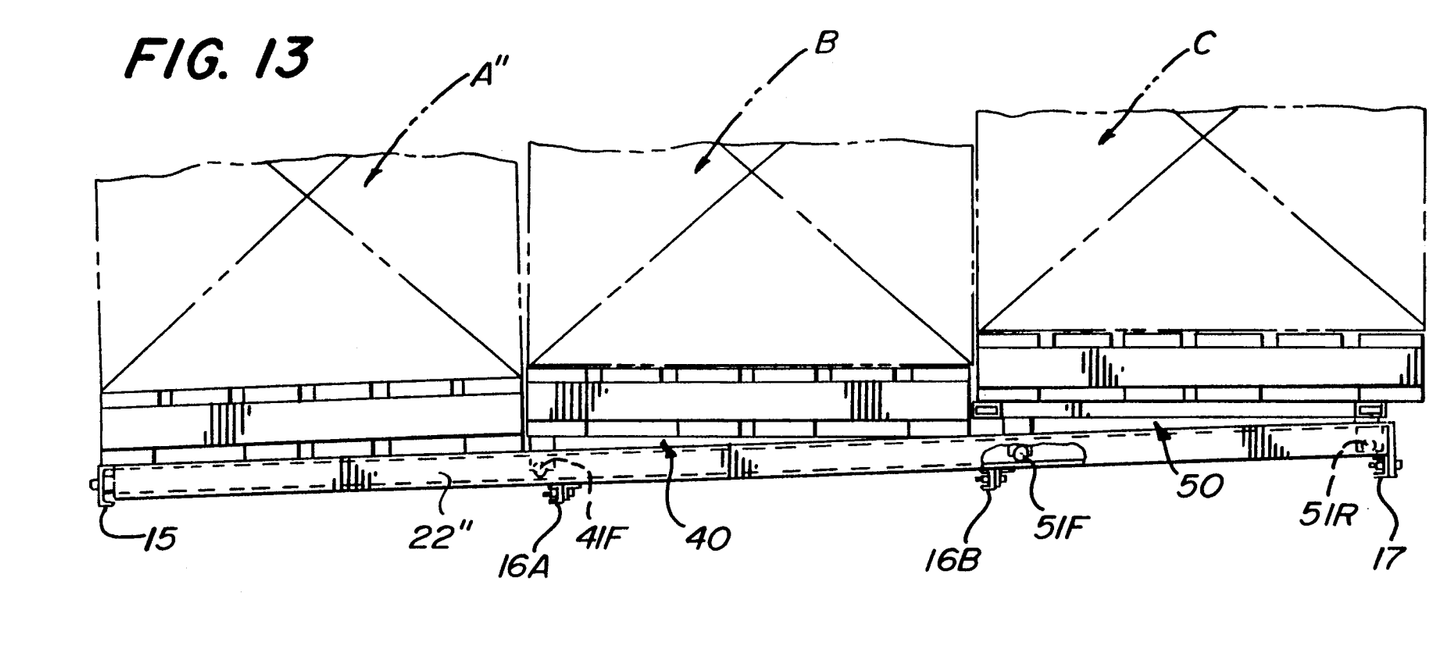
FIG. 13 is a side elevation of a 3-deep system.

In FIG. 13 there is shown a storage rack system in accordance with the invention for storing three pallets deep, which system comprises the same lower cart 40 and the same second cart 50 of the storage rack system shown in FIGS. 1-10, the main difference between said systems being that the framework of the system shown in FIG. 13 is constructed for storing three pallets deep whereas the framework of the system shown in FIGS. 1-10 is constructed for storing five pallets deep. Accordingly, in FIG. 13 the same parts have been given the same reference numberals and corresponding modified parts have been given the same reference numerals with double primes added.

The embodiment shown in FIG. 13 comprises a framework which comprises a plurality of storage bays adapted to contain two pairs of track means (comprising pairs of tracks 21 and 22") for storing two rows of pallets three deep, said framework including shelf beams 15, 16A, 16B and 17. The track means are formed by a pair of C-shaped channel members providing inner tracks 21 and a pair of C-shaped channel members forming second tracks 22". As shown in FIG. 13, the carts 40 and 50 are adapted to support pallet loads indicated at B" and C", respectively.

Carts 40 and 50 are mounted into the structural members providing pairs of tracks 21 and 22" in the same manner as described above with respect to the embodiment in FIGS. 1-10. Thus, cart 40 is constructed and arranged so that its front wheel assemblies 41F ride on tracks 22" and its rear wheel assemblies 41R ride on the inner tracks 21, and cart 50 is arranged so that its front and rear wheel assemblies 51F and 51R both ride on second tracks 22" in the same manner as described above with respect to the embodiment of FIGS. 1-10.

The carts 40 and 50 are constructed and arranged so that carts 40 and 50 are located at the entry end of the storage bay in their forward positions with the back position of cart 40 being two pallets deep from the entry end of the storage bay and the back position of cart 50 being three pallets deep from the entry end of the storage bay. Thus, each row of a storage bay can store three pallet loads A", B" and C" in an arrangement as shown in FIG. 13. The front supporting load A" is supported on the structural members forming tracks 21 and 22", the pallet supporting load B" is supported on cart 40 and the pallet supporting load C" is supported on cart 50. The pallet loads A", B" and C" will be placed in the position shown in FIG. 13 by conventional push-back loading techniques in the same manner as described above with respect to the embodiment shown in FIGS. 1-10.

What is claimed is:

1. In a storage rack for supporting pallet loads multiple pallets deep having a framework providing a plurality of storage bays each of which is defined by a plurality of vertical uprights and horizontal shelf beams, each of said storage bays comprising:

a plurality of carts, track means extending along the depth of said storage bay for supporting said carts for movement along said tracks from forward positions to back positions thereof, said track means comprising:

a first pair of parallel tracks having cart supporting portions extending over a distance including only part of the depth of the storage bay and being spaced apart across the width of the storage bay, a second pair of parallel tracks extending from front to back along the depth of said storage bay and being spaced apart across the width of the storage bay, said first pair of tracks being located inwardly of said second pair of tracks, and a third pair of parallel tracks extending from the front to the back along the depth of said storage bay and being spaced apart across the width of the storage bay, said third pair of tracks being located outwardly of said second pair of tracks, said plurality of carts including, a first cart including a frame providing support for a pallet load, front and rear wheel assemblies on each side of said first cart frame, and means for supporting each of said first cart wheel assemblies to make rolling contact with one of said tracks of said track means as said first cart moves along the depth of the storage bay between a forward position and a back position, a second cart including a frame providing support for a loaded pallet, front and rear wheel assemblies on each side of said second cart frame, and means for supporting each of said second cart wheel assemblies to make rolling contact with one of said track means as said second cart moves along the depth of the storage bay between a forward and a back position, the front wheel assemblies of said first cart being constructed and arranged to make rolling contact with said second tracks and the rear wheel assemblies of said first cart being constructed and arranged to make rolling contact with said first tracks, the front and rear wheel assemblies of said second cart being adapted to make rolling contact with said second tracks, and a third cart including a frame providing support for a pallet load, front and rear wheel assemblies on each side of said third cart frame, and means for supporting each of said third cart wheel assemblies to make rolling contact with one of said tracks of said track means as said third cart moves along the depth of the storage bay between a forward and a back position, said track means being mounted on the storage bay framework so as to be inclined toward the entry end of said storage bay, whereby said carts are supported so that they tend to roll along said track means toward the entry end of said storage bay.

2. A storage rack according to claim 1 wherein the forward position of said first cart is located at the entry end of the storage bay and the back position of said first cart is located two pallets deep from the entry end of the storage bay, the forward position of said second cart overlying the forward position of said first cart and the back position of said second cart being located three pallets deep from the entry end of the storage bay, the cart supporting portions of said first tracks being located in the region of two pallets deep from the entry end of the storage bay.

3. A storage rack according to claim 1 wherein said front wheel assemblies of said second cart are adapted to ride on said second tracks at locations rearwardly of said front wheel assemblies of said first cart.

4. A storage rack according to claim 3 wherein said rear wheel assemblies of said second cart are adapted to ride on said second tracks.

5. A storage rack according to claim 1 wherein the forward position of said third cart overlies the forward position of said second cart at the entry end of the storage bay and the back position of said third cart is located four pallets deep from the entry end of the storage bay.

6. A storage rack according to claim 5 wherein said front wheel assemblies of said third cart are adapted to make rolling contact with said third pair of tracks and said rear wheel assemblies of said third cart are adapted to make rolling contact with said second pair of tracks at locations rearwardly of the rear wheels of said second cart rear wheel assemblies.

7. A storage rack according to claim 1 for storing pallet loads of five pallets deep including a fourth pallet including a frame providing support for a loaded pallet, front and rear wheel assemblies on each side of said fourth cart frame, and means for supporting each of said fourth cart wheel assemblies to make rolling contact with said third pair of tracks of said track means as said fourth cart moves along the depth of the storage bay between a forward and a back position, the forward position of said fourth cart overlying the forward position of said first, second and third carts and the back position of said fourth cart being located five pallets deep from the entry end of said storage bay.

8. A storage rack according to claim 7 wherein each of said second and third tracks is formed by a structural member having an I-shaped cross-section and each of said first tracks is formed by a structural member having a C-shaped cross section.

9. A storage rack according to claim 1 wherein each of said second and third tracks is formed by a structural member having an I-shaped cross section and each of said first tracks is formed by a structural member having a C-shaped cross section.

10. A storage rack according to claim 1 wherein each of said first tracks is formed by a structural member having a C-shaped cross section.

11. A storage rack for supporting pallet loads multiple pallets deep having a framework providing a plurality of storage bays each of which is defined by a plurality of vertical uprights and horizontal shelf beams, each of said storage bays comprising:

a plurality of carts, track means extending along the depth of said storage bay for supporting said carts for movement along said tracks from forward positions to back positions thereof, said track means comprising:

a first pair of parallel tracks having cart supporting portions extending over a distance including only part of the depth of the storage bay and being spaced apart across the width of the storage bay, a second pair of parallel tracks extending from front to back along the depth of said storage bay and being spaced apart across the width of the storage bay, said first pair of tracks being located inwardly of said second pair of tracks, and a third pair of parallel tracks extending from the front to the back along the depth of said storage bay and being spaced apart across the width of the storage bay, said third pair of tracks being located outwardly of said second pair of tracks, said plurality of carts including:

a first cart including a frame providing support for a pallet load, front and rear wheel assemblies on each side of said first cart frame, and means for supporting each of said first cart wheel assemblies to make rolling contact with one of said tracks of said track means as said first cart moves along the depth of the storage bay between a forward position and a back position, a second cart including a frame providing support for a loaded pallet, front and rear wheel assemblies on each side of said second cart frame, and means for supporting each of said second cart wheel assemblies to make rolling contact with one of said tracks of said tracks means as said second cart moves along the depth of the storage bay between a forward and a back position, the rear wheel assemblies of said first cart being constructed and arranged to make rolling contact with said first tracks, the front wheel assemblies of said second cart being adapted to make rolling contact with said second tracks, a third cart including a frame providing support for a pallet load, front and rear wheel assemblies on each side of said third cart frame, and means for supporting each of said third cart wheel assemblies to make rolling contact with one of said tracks of said track means as said third cart moves along the depth of the storage bay between a forward and a back position, and a fourth cart including a frame providing support for a loaded pallet, front and rear wheel assemblies on each side of said fourth cart frame, and means for supporting each of said fourth cart wheel assemblies to make rolling contact with said third pair of tracks of said track means as said fourth cart moves along the depth of the storage bay between a forward and a back position, said track means being mounted on the storage bay framework so as to be inclined toward the entry end of said storage bay, whereby said carts are supported so that they tend to roll along said tracks means toward the entry end of said storage bay.

12. A storage rack for supporting pallet loads multiple pallets deep having a framework providing a plurality of storage bays each of which is defined by a plurality of vertical uprights and horizontal shelf beams, each of said storage bays comprising:

a plurality of carts,
track means extending along the depth of said storage bay for supporting said carts for movement along said tracks from forward positions to back positions thereof, said track means comprising:
a first pair of inwardly facing parallel tracks having cart supporting portions extending over a distance including only part of the depth of the storage bay and being spaced apart across the width of the storage bay,
a second pair of inwardly facing parallel tracks extending from front to back along the depth of said storage bay and being spaced apart across the width of the storage bay,
said first pair of tracks being located inwardly of said second pair of tracks and being spaced apart therefrom a substantial distance,
said plurality of carts including a first cart including a frame providing support for a pallet load, front and rear wheel assemblies on each side of said first cart frame arranged to face outwardly, and means for supporting each of said first cart wheel assemblies to make rolling contact with one of said tracks of said track means as said first cart moves along the depth of the storage bay between a forward position and a back position, and
a second cart including a frame providing support for a loaded pallet, front and rear wheel assemblies on each side of said second cart wheel assemblies to make rolling contact with one of said track means as said second cart moves along the depth of the storage bay between a forward and a back position,
the outwardly facing front wheel assemblies of said first cart being constructed and arranged to make rolling contact with said inwardly facing second tracks and the outwardly facing rear wheels assemblies of said first cart being constructed and arranged to make rolling contact with said inwardly facing first tracks,
said track means being mounted on the storage bay framework so as to be inclined toward the entry end of said storage bay, whereby said carts are supported so that they tend to roll along said track means toward the entry end of said storage bay.

13. In a storage rack for supporting pallet loads multiple pallets deep having a framework providing a plurality of storage bays each of which is defined by a plurality of vertical uprights and horizontal shelf beams, each of said storage bays comprising, at least one cart,
a track system extending along the depth of said storage bay for supporting said cart for movement along said track system from a forward position to a back position thereof, said track system comprising:
a first pair of parallel tracks extending along the depth of the storage bay and being spaced apart across the width of the storage bay,
a second pair of parallel tracks extending from the entry end of the storage bay along the depth of said storage bay and being spaced apart across the width of the storage bay,
said first pair of tracks being spaced apart a fixed distance inwardly of said second pair of tracks, said fixed distance between sufficient to provide clearance for the movement of a cart along said second tracks in the space between said first and second tracks,
said one cart including a frame providing support for a pallet load, front and rear wheel assemblies on each side of said cart frame, and means for supporting each of said wheel assemblies to make rolling contact with said tracks of said track system as said one cart moves along the depth of the storage bay between a forward position and a back position,
the front wheel assemblies of said one cart being constructed and arranged to make rolling contact with said second tracks and the rear wheels assemblies of said one cart being constructed and arranged to make rolling contact with said first tracks,
said track system being mounted on the storage bay framework so as to be inclined toward the entry end of said storage bay, whereby said cart is supported so that it tends to roll along said track system toward the entry end of said storage bay.

14. In a storage rack for supporting pallet loads multiple pallets deep having a framework providing a plurality of storage bays each of which is defined by a plurality of vertical uprights and horizontal shelf beams, each of said storage bays comprising:

a plurality of carts,
track means extending along the depth of said storage bay for supporting said carts for movement along said tracks from forward positions to back positions thereof, said track means comprising:
a first pair of parallel tracks extending along the depth of the storage bay and being spaced apart across the width of the storage bay,
a second pair of parallel tracks extending from its entry end along the depth of said storage bay and being spaced apart across the width of the storage bay,
said first pair of tracks being spaced apart a fixed distance inwardly of said second pair of tracks,
said plurality of carts including,
a first cart including a frame providing support for a pallet load, front and rear wheel assemblies on each side of said first cart frame, and means for supporting each of said first cart wheel assemblies to make rolling contact with one of said tracks of said track means as said first cart means along the depth of the storage bay between a forward position and a depth position, and a second cart including a frame providing support for a loaded pallet, front and rear wheel assemblies on each side of said second cart frame, and means for supporting each of said second cart wheel assemblies to make rolling contact with one of said tracks of said track means as said second cart moves along the depth of the storage bay between a forward and a back position, the front wheel assemblies of said first cart being constructed and arranged to make rolling contact with said second tracks and the rear wheel assemblies of said first cart being constructed and arranged to make rolling contact with said first tracks, the front wheel assemblies of said second cart being adapted to make rolling contact with said second tracks, said fixed distance being sufficient to provide clearance for the movement of said front wheel assemblies of said second cart along said second tracks in the space between said first and second tracks, said track means being mounted on the storage bay framework so as to be inclined toward the entry end of said storage bay, whereby said carts are supported so that they tend to roll along said track means toward the entry end of said storage bay.

15. A storage rack according to claim 14 wherein said forward positions of said first and second carts are located at the entry end of said storage bay, said clearance space between said first and second tracks providing clearance for the movement of said second cart between said first position thereof and a back position spaced multiple pallets deep along the depth of the storage bay.

16. A storage rack according to claim 15 wherein said second pair of parallel tracks are arranged to face inwardly.

* * * * *